(12) United States Patent
Asaoka

(10) Patent No.: US 7,755,807 B2
(45) Date of Patent: Jul. 13, 2010

(54) IMAGE READING DEVICE AND IMAGE FORMING APPARATUS

(75) Inventor: Shogo Asaoka, Hoi-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1079 days.

(21) Appl. No.: 11/258,217

(22) Filed: Oct. 26, 2005

(65) Prior Publication Data

US 2007/0008591 A1 Jan. 11, 2007

(30) Foreign Application Priority Data

Jul. 8, 2005 (JP) ............................. 2005-200486

(51) Int. Cl.
*H04N 1/04* (2006.01)
(52) U.S. Cl. .................. 358/474; 358/1.2; 358/1.9; 358/498; 358/497; 345/174; 345/207; 345/173; 345/169; 345/156; 257/434; 257/E21.499; 257/59; 250/227.29; 250/208.1; 359/613; 399/301; 399/66
(58) Field of Classification Search ................. 358/474, 358/486, 497, 1.9, 1.2; 250/584, 208.1, 227.29; 324/750, 493; 313/493, 310; 345/174, 101, 345/89, 690, 207, 87, 173, 169, 156; 399/66, 399/301; 257/434, E21.499, E31.11, 59, 257/E29.002; 359/613
See application file for complete search history.

(56) References Cited

U.S. PATENT DOCUMENTS

| | | | |
|---|---|---|---|
| 4,870,458 A | | 9/1989 | Shibuya et al. |
| 6,441,928 B1 * | | 8/2002 | Tuli et al. .................... 358/473 |
| 6,587,231 B1 * | | 7/2003 | Sung ......................... 358/497 |
| 6,614,563 B1 * | | 9/2003 | Batten et al. ................. 358/487 |
| 6,684,044 B2 * | | 1/2004 | Hayashi ....................... 399/220 |
| 6,741,378 B2 * | | 5/2004 | Sugiyama et al. ........... 359/245 |
| 6,989,917 B2 * | | 1/2006 | Honbo ......................... 358/475 |
| 7,072,082 B2 * | | 7/2006 | Yokota ........................ 358/497 |
| 7,119,933 B2 * | | 10/2006 | Sugimoto .................... 358/474 |
| 7,428,080 B2 * | | 9/2008 | Koshimizu et al. .......... 358/474 |
| 7,428,081 B2 * | | 9/2008 | Yamauchi .................... 358/474 |
| 7,471,424 B2 * | | 12/2008 | Ishido et al. ................. 358/449 |

(Continued)

FOREIGN PATENT DOCUMENTS

JP 62-284419 12/1987

(Continued)

OTHER PUBLICATIONS

Notification of Reasons for Refusal issued in corresponding Japanese Patent Application No. 2005200486, mailed Oct. 23, 2007, and English translation thereof.

*Primary Examiner*—Negussie Worku
(74) *Attorney, Agent, or Firm*—Buchanan Ingersoll & Rooney PC

(57) ABSTRACT

The image reading device of the present invention is an image reading device comprising a reading unit reading an image of an original document, a clear plate disposed between the original document and the reading unit, a clear photoemitting layer included in the clear plate and having a plurality of emitting areas, a clear input sensor included in the clear plate and outputting a two-dimensional position of a pushed place on the clear plate and an controller displaying an operation panel on the clear plate using the clear photoemitting layer and receiving operations to the operation panel.

20 Claims, 9 Drawing Sheets

U.S. PATENT DOCUMENTS 7,485,890 B2 * 2/2009 Hakamata et al. ........... 250/591

FOREIGN PATENT DOCUMENTS

| | | |
|---|---|---|
| JP | 63-271332 | 11/1988 |
| JP | 5-40317 | 2/1993 |
| JP | 5-341605 | 12/1993 |
| JP | 7-72557 | 3/1995 |
| JP | 7-84233 | 3/1995 |
| JP | 8-95352 | 4/1996 |

* cited by examiner

IMAGE READING DEVICE AND IMAGE FORMING APPARATUS

RELATED APPLICATIONS

This application is based on application No. 2005-200486, filed in Japan, the contents of which are hereby incorporated by reference.

BACKGROUND OF THE INVENTION

1. Field of the Invention

The present invention relates to an image reading device that is included in a copying machine or the like and reads images of original documents, as well as to an image forming apparatus having such device, and more particularly to an image reading device that also functions as an operation panel and to an image forming apparatus having such device.

2. Description of the Prior Art

An image forming apparatus such as a copying machine, for example, conventionally includes an image reading device that reads images of original documents. An image reading device generally includes a platen glass on which the original document is placed, a photoelectric conversion element or the like that receives the light emitted to the original document surface via the platen glass and reflected therefrom and converts this light into electric signals. In addition, an image forming apparatus includes an operation panel, and the user of the apparatus inputs various desired operation parameters via this operation panel. For example, in a copying operation carried out using a copying machine, copied images are formed based on the image data read by the image reading device and in accordance with the input copying operation parameters.

Such an operation panel is often disposed on the front side or top side of the apparatus to enable easy use thereof by the user. Furthermore, because the operation panel must be made compact due to space limitations, while the number of display items has increased with the increasing number of functions incorporated in image forming apparatuses in recent years, a layered system or the like is often used for the display. However, it is still sometimes difficult to determine the relationship between the original document size and the actual print size, or the setting of printing orientation. In view of this problem, Japanese Laid-Open Patent Applications H5-40317 and H7-84233 disclose copying machines having a platen glass comprising a photo-transmitting liquid crystal panel. According these technologies, information such as the position and size of the original document can be displayed on the liquid crystal panel in a way that is easy to understand.

However, because a liquid crystal panel is used in both of the conventional technologies mentioned above, the viewing angle is narrow, and depending on the position or the height of the user, the display may be difficult to see. In addition, the problem exists that because liquid crystal is not a self-illuminating display, it requires light, which leads to a complex apparatus construction. Furthermore, because a liquid crystal panel generally uses a deflecting plate and the panel thickness is in the order of several millimeters due to the considerable thickness of the liquid crystal cells, the amount of light declines significantly when light is transmitted through the panel. As a result, in an image reading device that illuminates an original document from below the platen glass using a lamp or the like and inputs the reflected light to a photoelectric conversion element, noise may increase and lead to a deterioration in image quality.

Furthermore, with an apparatus in which instructions are input via the operation panel while the user views the display thereon, as in the case of the technology disclosed in the Japanese Laid-Open Patent Application H7-84233 mentioned above, while detailed instructions can be provided, the buttons and the like used for input purposes tend to become small, which may render the apparatus less easy to use. Moreover, if letters or the like are to be added to the printing, it is difficult to accurately input such letters in the desired positions, resulting in a number of input attempts while viewing the display.

SUMMARY OF THE INVENTION

The present invention was devised in order to resolve the problems with the image reading device of the conventional art and the image forming apparatuses that includes an image reading device of this type. An object of the present invention is to provide an image reading device that takes up a small amount of space and is easy to use, as well as to an image forming apparatus that includes such device.

In order to attain this object, the image reading device of the present invention comprising a reading unit reading an image of an original document, a clear plate disposed between the original document and the reading unit, a clear photoemitting layer included in the clear plate and having a plurality of emitting areas, a clear input sensor included in the clear plate and outputting a two-dimensional position of a pushed place on the clear plate and an controller displaying an operation panel on the clear plate using the clear photoemitting layer and receiving operations to the operation panel.

According to the image reading device of the present invention, images of an original document placed on the clear plate is read by the reading unit. Because the clear plate has a clear photoemitting layer, an operation panel can be displayed on the clear panel via control by the controller. In addition, because the clear plate has a clear input sensor, operations to the operation panel can be received by the controller. Therefore, because the clear plate on which the original document is placed can be used as the operation panel, it is no longer necessary to set aside a large space for an operation panel and therefore space conservation can be achieved.

The present invention also comprises an image forming apparatus comprising a reading unit reading an image of an original document, a clear plate disposed between the original document and the reading unit, a clear photoemitting layer included in the clear plate and having a plurality of emitting areas, a clear input sensor included in the clear plate and outputting the two-dimensional position of a pushed place on the clear plate, an controller displaying an operation panel on the clear plate using the clear photoemitting layer and receiving operations to the operation panel and an image forming unit forming the image read by the reading unit on a recording medium.

BRIEF DESCRIPTION OF THE DRAWINGS

These and other objects and features of the present invention will become clear from the following description taken in conjunction with the preferred embodiments thereof with reference to the accompanying drawings, in which.

DESCRIPTION OF THE PREFERRED EMBODIMENTS

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

An embodiment is described below in which the present invention is applied in a copying machine having an image reading device that reads the images of original documents.

Figure 1:
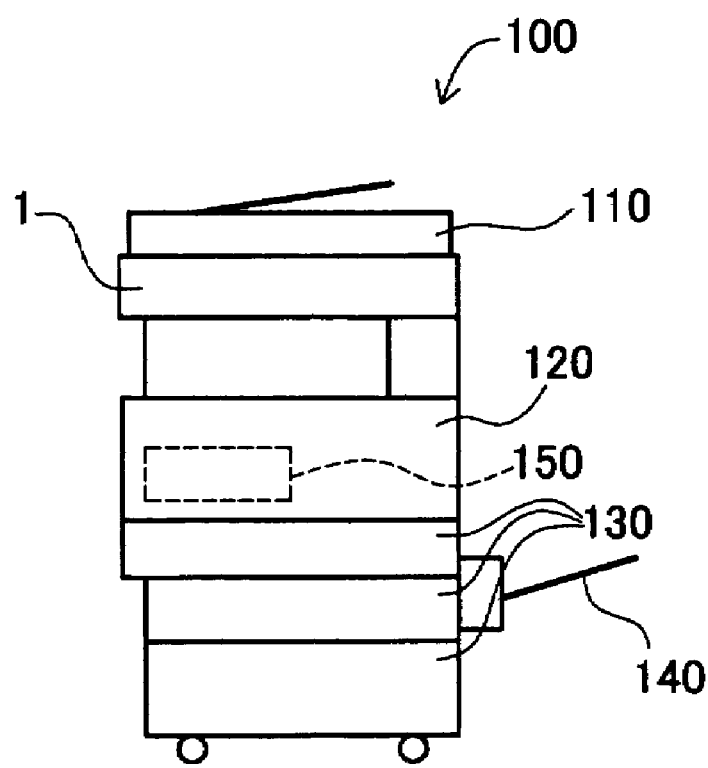
FIG. 1 is an external view showing the basic construction of a copying machine pertaining to an embodiment.

The copying machine 100 of this embodiment has an image reading device 1 as shown in the external view of FIG. 1. The copying machine 100 further includes an automatic document feeder 110 at the top part thereof, as well as a printing unit 120, a paper supply unit 130 and a manual paper supply tray 140, which are disposed in this order from the top. The copying machine 100 also includes an internal storage device 150 that stores various image data, operation parameter values and the like. The top surface of the printing unit 120 also serves as an ejection tray.

The image reading device 1 reads the images of original documents, and the image data read thereby can be accumulated in the storage device 150. The image reading device 1 is described in detail below. The automatic document feeder 110 feeds the original document to the image reading device 1 one sheet at a time. It may also have a function to flip over the sheet. The printing unit 120 forms an image on a sheet of paper supplied from the paper supply unit 130 or the manual paper supply tray 140 using the public-domain electrophotographic method based on the image data read by the image reading device 1. Alternatively, image formation may be carried out based on image data accumulated in the storage device 150 or received from an external device.

Figure 2:
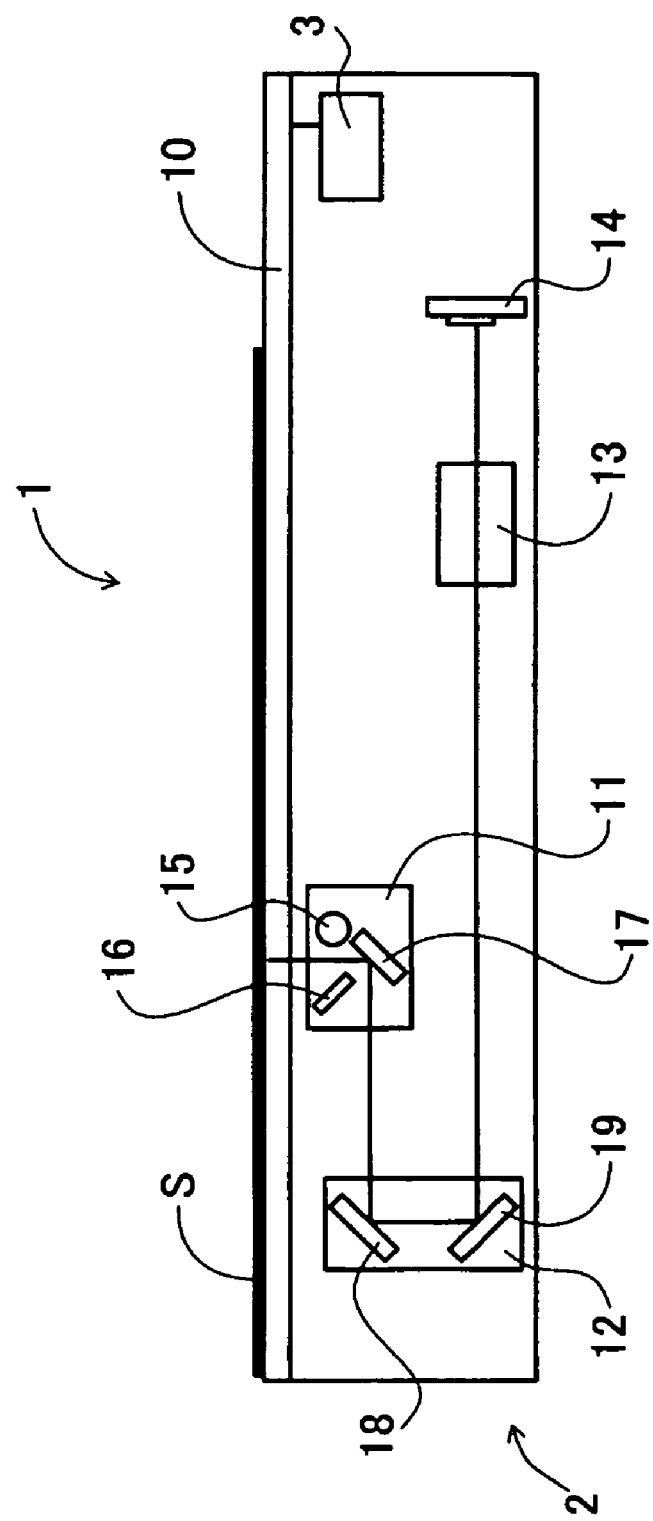
FIG. 2 is a cross-sectional view showing the basic construction of an image reading device pertaining to the embodiment.

The image reading device 1 of this embodiment has a platen glass 10 on which an original document S is placed on the top surface of the reading unit 2 as shown in FIG. 2. A controller 3 that controls the platen glass 10 is connected thereto. The reading unit 2 reads the image of the original document placed on the platen glass 10, and has a first slider unit 11, a second slider unit 12, a lens 13 and a photoelectric conversion element 14. Furthermore, the first slider unit 11 includes a light source 15, a reflecting plate 16 and a first reflecting mirror 17, while the second slider unit 12 includes a second reflecting mirror 18 and a third reflecting mirror 19.

With this image reading device 1, the light emitted from the light source 15 illuminates the original document S directly or via the reflecting plate 16. The light reflected from the original document S is reflected off the first reflecting mirror 17, second reflecting mirror 18 and third reflecting mirror 19, is reduced by the lens 13, and finally forms an image on the light-receiving surface of the photoelectric conversion element 14. The components other than the platen glass 10 are generally used in reduction image reading devices and will not be explained herein.

Figure 3:
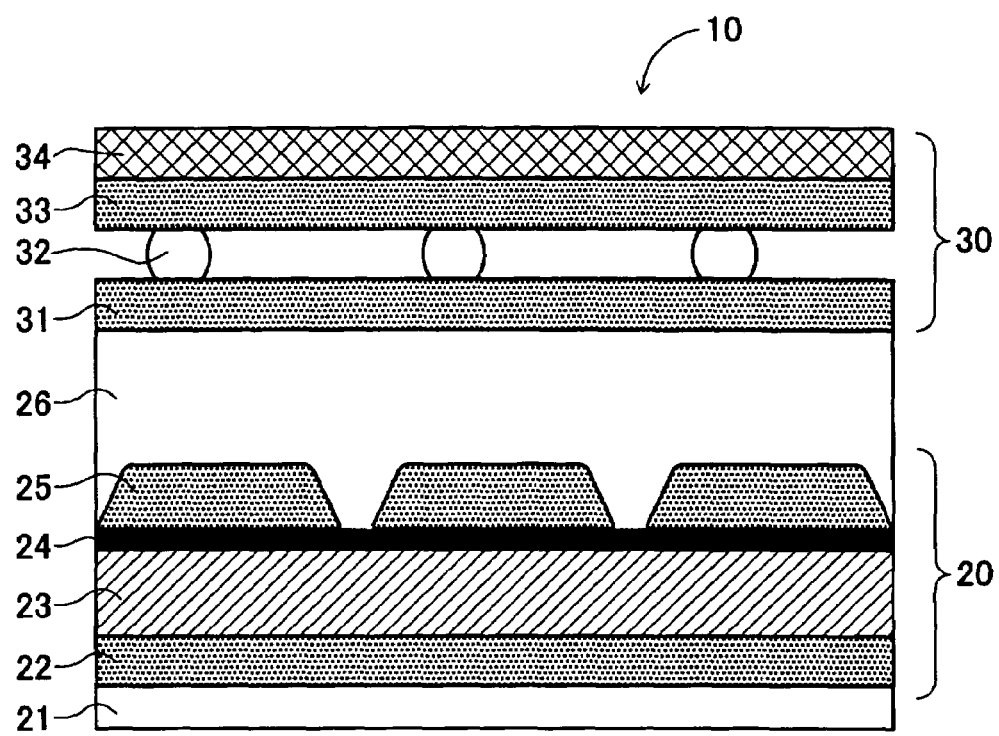
FIG. 3 is a cross-sectional view showing the basic construction of a platen glass pertaining to the embodiment.

As shown in the partially expanded view in FIG. 3, the platen glass 10 of this embodiment comprises a transparent organic EL (electroluminescence) display 20 and a pressure sensor 30, which are layered together. The use of a transparent organic EL display enables the platen glass to be formed thinner than when a liquid crystal panel is used and minimizes the amount of light reduction. As a result, original documents can be read while maintaining high image quality. The transparent organic EL display 20 comprises a glass substrate 21, a transparent electrode layer 22, an EL photoemitting layer 23, a cathode layer 24, a transparent electrode layer 25 and cover glass 26. The EL photoemitting layer 23 is a light source formed of a transparent organic EL element using an organic compound, and emits light by re-combining electrons of an electron carrier layer and electron holes of a hole carrier layer within the EL photoemitting layer 23. The transparent electrode layers 22, 25 comprise transparent electrodes using indium-tin oxide (ITO) compound and serves to convey electricity to the EL photoemitting layer 23.

Figure 4:
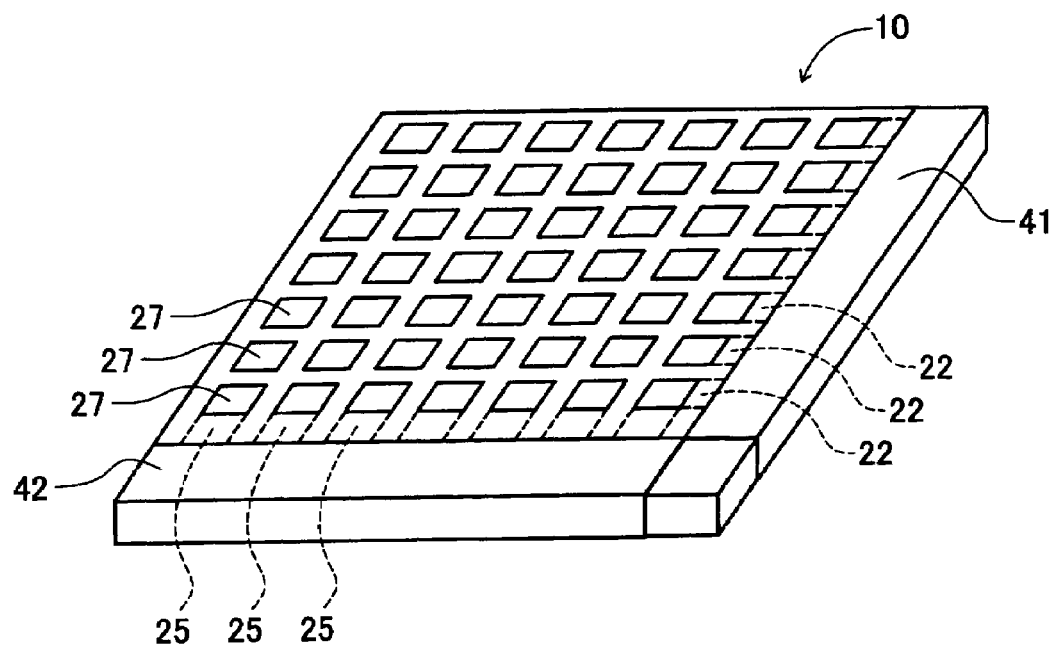
FIG. 4 is an explanatory drawing showing an example of the driving method for a photoemitting layer.

Voltage impressed to the transparent electron layers 22, 25 is controlled by drive circuits 41, 42 that are disposed along the edges of the platen glass 10, respectively, as shown in FIG. 4. These transparent electrode layers 22, 25 are disposed such that the electrodes of respective layers are disposed at a right angle to each other with the EL photoemitting layer 23 and cathode layer 24 therebetween, as shown in FIGS. 3 and 4. The band-shaped electrodes of the transparent electrode layer 22 that are disposed in a lateral fashion in the drawings are selectively controlled by the drive circuit 41 while the band-shaped electrodes of the transparent electrode layer 25 that are disposed in a longitudinal fashion in the drawings are selectively controlled by the drive circuit 42. The areas at which these electrodes of the transparent electrode layers 22 and 25 cross each other comprise photoemitting units 27, which are disposed in a lattice configuration in the platen glass 10. In other words, because each photoemitting unit 27 is driven by the drive circuits 41, 42 to turn ON or OFF, the EL photoemitting layer 23 can be caused to emit light at the desired areas. These drive circuits 41, 42 are disposed outside the image reading range and are controlled by the controller 3.

Figure 5:
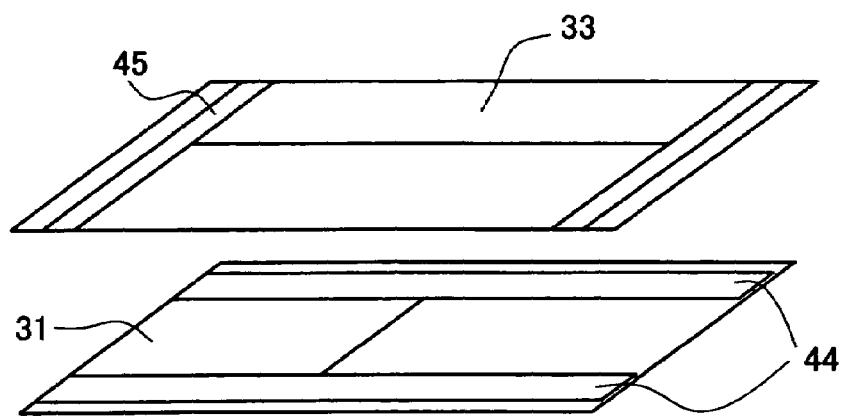
FIG. 5 is an explanatory drawing showing the basic construction of a pressure sensor.
Figure 6:
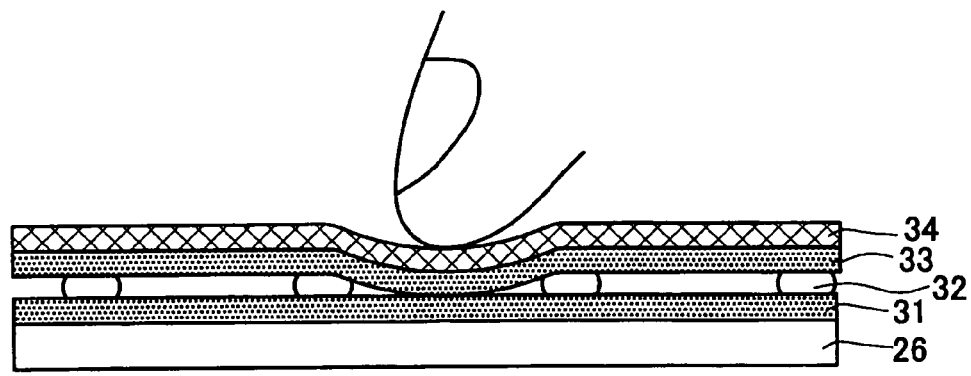
FIG. 6 is an explanatory drawing showing the operation of the pressure sensor.

The pressure sensor 30 comprises, as shown in FIG. 3, a transparent conductive film 31 disposed on the cover glass 26, spacers 32, a transparent conductive film 33 and a film 34, which are layered together. Transparent X-axis electrodes 44 and Y-axis electrodes 45 are formed in the transparent conductive films 31, 33, respectively, as shown in FIG. 5, and are usually separated from each other by the spacers 32. When pressure is exerted on the pressure sensor 30 from above, parts of the transparent conductive films 31 and 33 come into contact with each other as shown in FIG. 6. As a result, the X-axis electrodes 44 and Y-axis electrodes 45 come into contact and a current flow. Here, the precise location that was pressed can be detected by measuring the voltage division ratio created by the resistance values for the transparent conductive films 31, 33. The result of detection by the pressure sensor 30 is input to the controller 3.

Dot spacers comprising granular insulators are generally used as the spacers 32 used in the pressure sensor 30, and highly durable and relatively large spacers (having a diameter of approximately 80 μm) are used in this embodiment. However, where it is required that the display contain no observable dots, spacers having a diameter of approximately 50 μm may be used. In addition, in devices that requires more specific positioning via the use of a more precise input tool such as a pen or the like instead of a finger, spacers having a smaller diameter of 30 μm or less may be used.

Figure 7:
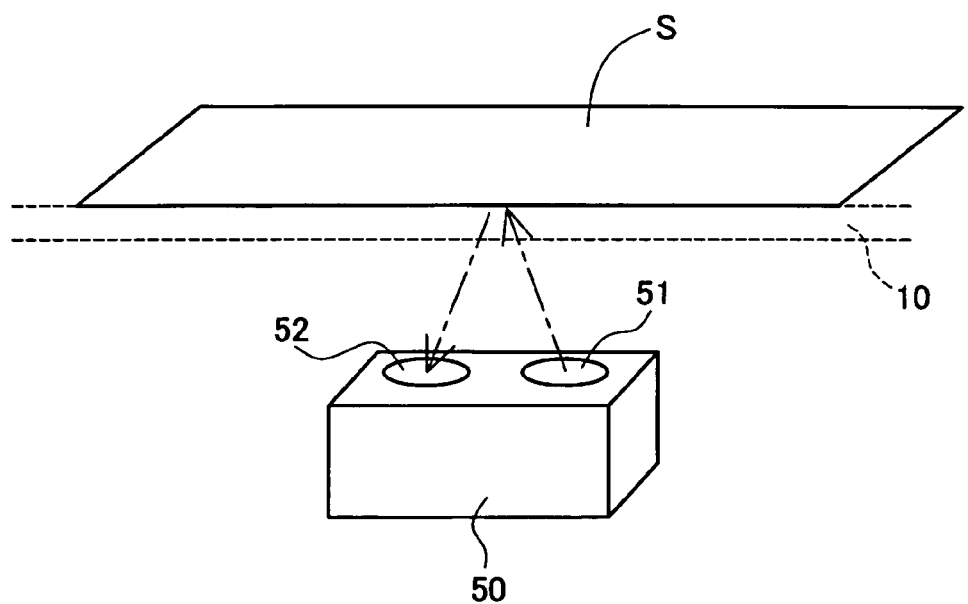
FIG. 7 is an explanatory drawing showing the basic construction of an original document size detection sensor.

Multiple original document size detection sensors 50 are disposed at prescribed positions below the platen glass 10, as shown in FIG. 7. Each original document size detection sensor 50 has a photoemitting surface 51 and light-receiving surface 52, and the light emitted from the photoemitting surface 51 and reflected by the original document is received by the light-receiving surface 52. When the light is received, the distance to the object can be measured based on the angle of incidence to the light-receiving surface 52. In this embodiment, it is determined, based on whether or not an object (comprising an original document here) falls within a prescribed threshold range, whether or not an original document is placed there. Multiple original document size detection sensors 50 are placed within the reading range of the platen glass 10, and after an original document is placed on the platen glass 10, the results of detection by the original document size sensors 50 are aggregated prior to reading in order to detect the size of the original document in advance. The results of detection by the original document size sensors 50 are input to the controller 3.

Figure 8:
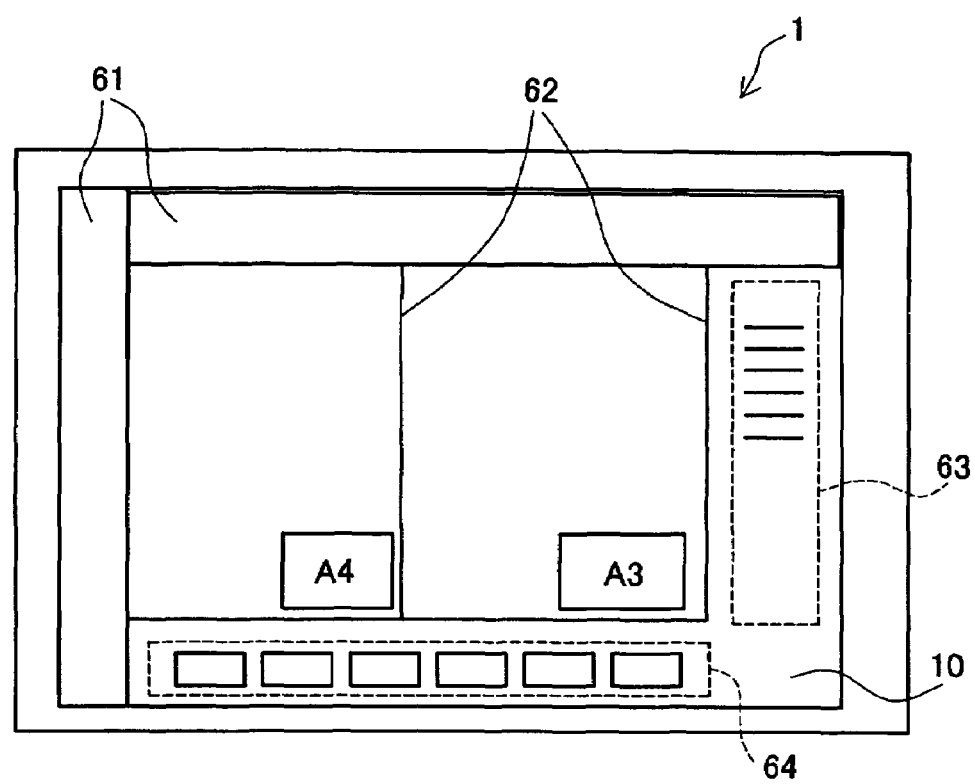
FIG. 8 is an explanatory drawing showing an example of display contents.

The processing to read the image of the original document S using the image reading device 1 of this embodiment will now be explained below. This processing is performed mainly by the controller 3. In the description below, an explanation is provided based on the image reading device 1 included in a copying machine. First, as shown in FIG. 8, longitudinal and lateral standard scales 61, a paper size frame 62 conforming to the currently set paper supply cassette, a copying setting display area 63, an operation button area 64 and the like are displayed on the platen glass 10. This prevents such errors as placement of an original document on the wrong area. Buttons to set the expansion/reduction rate and the number of copies to be made and the copy mode are displayed in the copy settings display area 63 and to instruct that copying operations be started or stopped, are displayed in the operation button area 64. When an area within the operation button area 64 is pressed by the finger or the like, the location of the area pressed is detected by the pressure sensor 30 and prescribed setting change is carried out accordingly.

Figure 9:
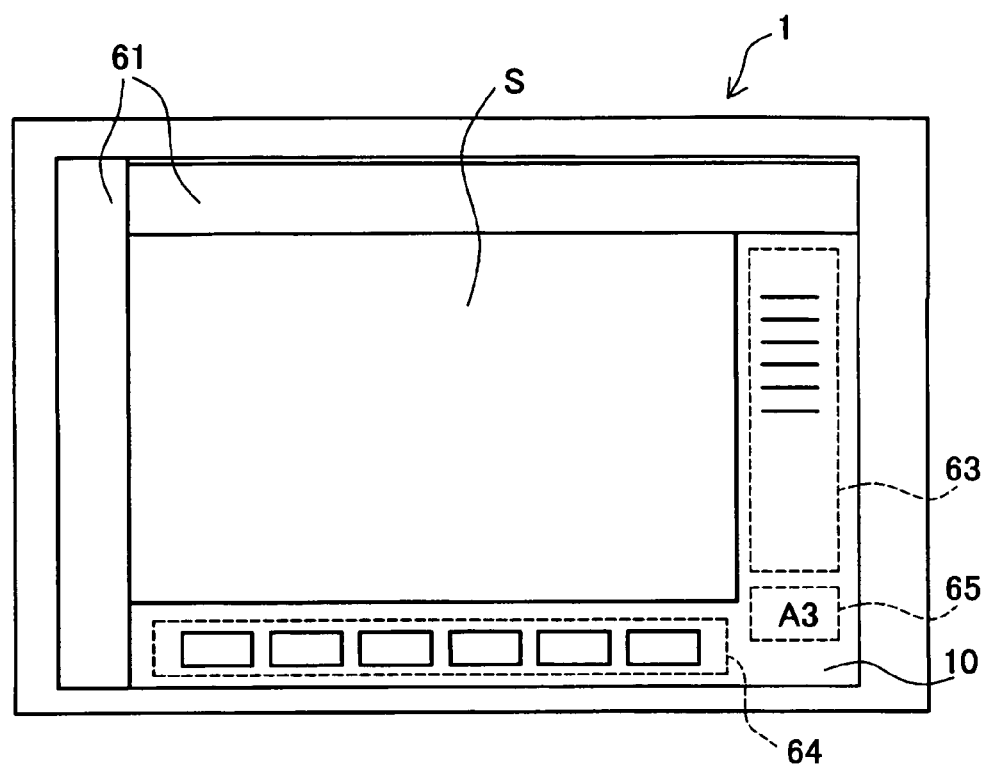
FIG. 9 is an explanatory drawing showing an example of display contents.

When the original document S is set on the platen glass 10 by the user, the paper size frame 62 becomes hidden, as shown in FIG. 9. Therefore, the size of the original document is first detected by the original document size detection sensors 50, and the original document size 65 is displayed outside the original document range. Because the original document size 65 is displayed outside the original document range, the display is not hidden by the original document, making the apparatus easy to use. Where a paper size that matches the size of the original document is not set in the paper supply cassette, the smallest paper size that accommodates the entire original document may be displayed together with the paper size frame 62 therefor. Various setting instructions input by the user from the operation button area 64 from the user are accepted in this state, and when the reading start button is pressed, reading is begun.

During reading, the platen glass 10 is maintained in a transparent state. In other words, the drive circuits 41, 42 do not cause any photoemitting units 27 to emit light. Therefore, the image reading device 1 works in the same way as a general reduction optical image reading device, and the image of the original document S is input as image data S1 by the photoelectric conversion element 14.

Figure 10:
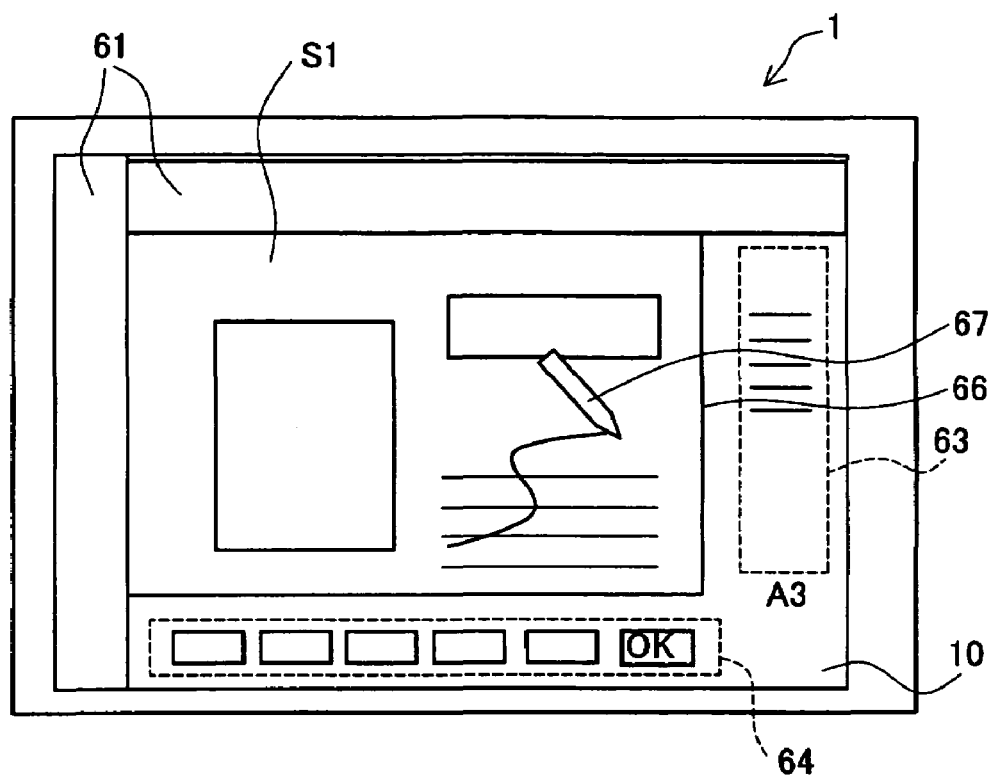
FIG. 10 is an explanatory drawing showing an example of display contents.

The image data S1 read of the original document is displayed on the platen glass 10 as shown in FIG. 10. The user can view this display by removing the original document S from the platen glass 10. When this is done, the paper size frame 66 set via the current settings is simultaneously displayed. The user can now instruct various setting changes directly on the display by operating the copy settings display area 63 and operation button area 64 while viewing the read original document image. For example, it is acceptable if various setting options are displayed as buttons in the operation button area 64 by pressing the setting items desired to be changed in the copy settings display area 63.

Furthermore, letters and images may be added to the image data using a software keyboard on the platen glass 10 or by enabling input using an input pen 67. It is acceptable if handwritten letters are recognized and corrected into standard style letters. In addition, the image residing within a prescribed area range may be deleted by using an eraser pen or by having the range recognized. In addition, image areas may be designated and moved or the colors thereof may be changed.

When the image data to be output is displayed on the platen glass 10, the user presses the 'OK' button in the operation button area 64. This causes the currently-displayed image to be formed on designated paper.

Figure 11:
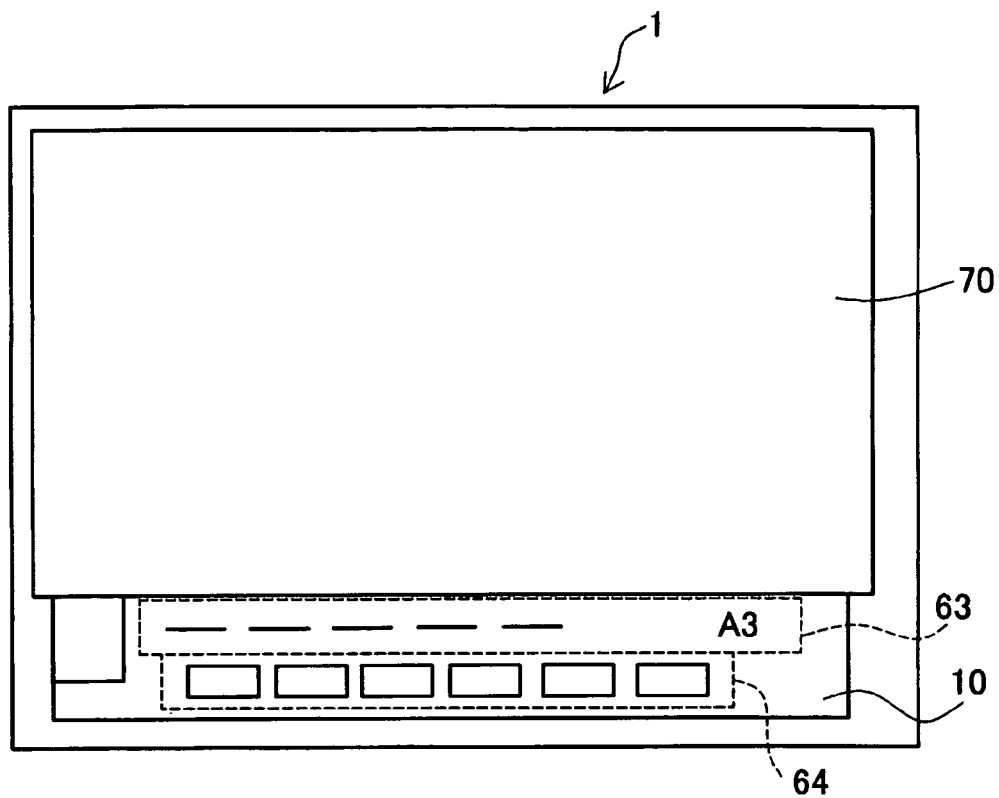
FIG. 11 is an explanatory drawing showing an example of display contents.

Although the original document holder that covers the platen glass 10 was not explained in the description given above, such a holder is generally of a size that covers the entire platen glass 10 in a copying machine or the like. This is because the original document holder prevents the original document S from being displaced during reading and prevents the light emitted from the light source 15 for image reading from striking the eyes of the user. In contrast, the image reading device 1 may include an original document holder 70 that matches the reading range and a platen glass 10 that is larger than the reading range as shown in FIG. 11.

In this way, because the copy settings display area 63 and operation button area 64 can be displayed outside the reading range of the platen glass 10, various instructions can be input with the original document holder 70 closed. Once reading of the original document is completed, the original document holder 70 can be opened, enabling the original document S to be removed and the display on the platen glass 10 to be viewed.

As described above in detail, with the copying machine 100 of this embodiment, because a transparent organic EL display 20 is used as the platen glass 10 of the image reading device 1, the platen glass 10 can be made transparent during image reading. Because the organic EL display 20 can be made thin in comparison with a liquid crystal panel, high-quality image reading is obtained. Furthermore, the read image data can be displayed on the platen glass 10 after reading. In addition, because the platen glass 10 of this embodiment includes a pressure sensor 30, it can also function as an operation panel. User operation even during viewing of the actual-size image data is accordingly enabled, providing good operability. Therefore, as a whole, space conservation can be achieved while easy operability is obtained via the image reading device 1 that reads high-quality images and the copying machine 100 that incorporates the image reading device 1.

This embodiment is a mere example, and does not limit the present invention in any way. Therefore, the present invention can naturally be improved and/or modified in various ways within the essential scope thereof.

For example, the EL photoemitting layer 23 of the image reading device 1 may comprise an inorganic EL light source or an organic EL light source.

In addition, while the embodiment described above uses as the driving method the passive-matrix method in which the drive circuits are externally mounted, it is acceptable if the active-matrix method in which switching elements are added to the pixels is used.

Furthermore, for example, the embodiment described above enables various types of editing of the read image, but it is acceptable if a storage device is included in the image reading device such that the same types of processing can be performed to an image retrieved from the storage device. It is also acceptable if various types of editing are enabled with regard to image data sent from an external device such as a computer.

What is claimed is:

1. An image reading device comprising:
   a reading unit reading an image of an original document;
   a clear plate disposed between the original document and the reading unit;
   a clear photoemitting light source layer included in the clear plate and having a plurality of emitting areas;
   a clear input sensor included in the clear plate, the clear input sensor outputs a signal representing a two-dimensional position of a depressed place on the clear plate; and
   a controller displaying an operation panel on the clear plate using the clear photoemitting layer and receiving operations to the operation panel.

2. The image reading device according to claim 1, wherein the clear photoemitting layer has clear electrodes and an electroluminescence layer.

3. The image reading device according to claim 1 further comprising an original document sensor detecting the area occupied by the original document placed on the clear plate, wherein the controller displays outside the area occupied by the original document when the original document is placed on the clear plate.

4. The image reading device according to claim 1, wherein the controller displays the area in which the original document should be placed using the clear photoemitting layer.

5. The image reading device according to claim 1, wherein the controller displays the size of the original document using the clear photoemitting layer.

6. The image reading device according to claim 1, wherein the clear plate is maintained transparent during reading operation.

7. The image reading device according to claim 1, wherein the image read by the reading unit is displayed on the clear plate.

8. The image reading device according to claim 7 further comprising an image editing unit editing the displayed image based on the output from the clear input sensor.

9. The image reading device according to claim 1 further comprising an original document holding member corresponding to a reading range where the reading unit reads, wherein the clear plate is larger than the original document holding member.

10. The image reading device according to claim 9, wherein the operation panel is displayed on the clear plate outside the area covered by the original document holding member.

11. An image forming apparatus comprising:
    a reading unit reading an image of an original document;
    a clear plate disposed between the original document and the reading unit;
    a clear photoemitting light source layer included in the clear plate and having a plurality of emitting areas;
    a clear input sensor included in the clear plate, the clear input sensor outputs a signal representing a two-dimensional position of a depressed place on the clear plate;
    a controller displaying an operation panel on the clear plate using the clear photoemitting layer and receiving operations to the operation panel; and
    an image forming unit forming the image read by the reading unit on a recording medium.

12. The image forming apparatus according to claim 11, wherein the clear photoemitting layer has clear electrodes and an electroluminescence layer.

13. The image forming apparatus according to claim 11 further comprising an original document sensor detecting the area occupied by the original document placed on the clear plate, wherein the controller displays outside the area occupied by the original document when the original document is placed on the clear plate.

14. The image forming apparatus according to claim 11, wherein the controller displays the area in which the original document should be placed using the clear photoemitting layer.

15. The image forming apparatus according to claim 11, wherein the controller displays the size of the original document using the clear photoemitting layer.

16. The image forming apparatus according to claim 11, wherein the clear plate is maintained transparent during reading operation.

17. The image forming apparatus according to claim 11, wherein the image read by the reading unit is displayed on the clear plate.

18. The image forming apparatus according to claim 17 further comprising an image editing unit editing the displayed image based on the output from the clear input sensor.

19. The image forming apparatus according to claim 11 further comprising an original document holding member corresponding to a reading range where the reading unit reads, wherein the clear plate is larger than the original document holding member.

20. The image forming apparatus according to claim 19, wherein the operation panel is displayed on the clear plate outside the area covered by the original document holding member.

* * * * *